United States Patent
Kakui et al.

(10) Patent No.: US 7,580,183 B2
(45) Date of Patent: Aug. 25, 2009

(54) LIGHT GENERATOR, OPTICAL AMPLIFIER, AND OPTICAL COMMUNICATION SYSTEM

(75) Inventors: Motoki Kakui, Yokohama (JP); Toshiaki Okuno, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 29 days.

(21) Appl. No.: 10/377,104

(22) Filed: Mar. 3, 2003

(65) Prior Publication Data

US 2003/0210913 A1    Nov. 13, 2003

Related U.S. Application Data

(60) Provisional application No. 60/364,085, filed on Mar. 15, 2002.

(30) Foreign Application Priority Data

Mar. 1, 2002  (JP) ................ P2002-056042

(51) Int. Cl.
*G02B 26/00* (2006.01)
*H01S 3/105* (2006.01)
*H01S 3/23* (2006.01)
*H04B 10/12* (2006.01)

(52) U.S. Cl. ............ 359/334; 359/238; 359/239; 372/20; 372/23; 372/26; 372/28

(58) Field of Classification Search ........ 372/28, 372/20, 23, 26; 359/334, 238, 239; 398/182, 398/183

See application file for complete search history.

(56) References Cited

U.S. PATENT DOCUMENTS 3,573,654 A * 4/1971 Smiley .................. 372/7

(Continued)

FOREIGN PATENT DOCUMENTS

JP    63-287088    11/1988

(Continued)

OTHER PUBLICATIONS

R. H. Stolen and A. M. Johnson, "The Effect of Pulse Walkoff on Stimulated Raman Scattering in Fibers", IEEE Journal of Quantum Electronics, vol. QE22, No. 11, pp. 21542160 (Nov. 1986).*

(Continued)

*Primary Examiner*—Eric Bolda
(74) *Attorney, Agent, or Firm*—McDermott Will & Emery LLP

(57) ABSTRACT

In an optical amplifier according to the present invention, a change signal from a change signal source is fed into a light source or a drive circuit. The wavelength of light outputted from the light source is changed based on the change signal. The wavelength-changed output light from the light source is outputted as pumping light from a pumping light generator to be supplied backwardly via an optical multiplexer/demultiplexer into an optical fiber. Signal light is Raman-amplified in the optical fiber with the supply of the pumping light.

13 Claims, 14 Drawing Sheets

U.S. PATENT DOCUMENTS

| | | | |
|---|---|---|---|
| 4,575,851 A * | 3/1986 | Seki et al. | 372/45.01 |
| 5,991,061 A * | 11/1999 | Adams et al. | 398/182 |
| 6,374,006 B1 * | 4/2002 | Islam et al. | 385/15 |
| 6,389,047 B1 * | 5/2002 | Fischer | 372/32 |
| 6,433,921 B1 * | 8/2002 | Wu et al. | 359/334 |
| 6,611,368 B1 * | 8/2003 | Grant et al. | 359/334 |
| 6,640,043 B2 * | 10/2003 | Handerek | 385/139 |
| 6,748,136 B2 * | 6/2004 | Headley et al. | 385/27 |
| 6,813,067 B1 * | 11/2004 | Birk et al. | 359/334 |
| 2002/0021487 A1 * | 2/2002 | Akasaka et al. | 359/334 |

FOREIGN PATENT DOCUMENTS

| | | |
|---|---|---|
| JP | 05-347446 | 12/1993 |
| JP | 07-022702 | 1/1995 |
| JP | 2000-332332 | 11/2000 |
| JP | 2001-033838 | 2/2001 |
| JP | 2001-085787 | 3/2001 |
| JP | 2001-189521 | 7/2001 |
| JP | 2001-237494 | 8/2001 |
| JP | 2001-1249369 | 9/2001 |
| JP | 2002-006349 | 1/2002 |

OTHER PUBLICATIONS

G. P. Agrawal, Fiber-Optic Communication Systems, 3rd edition, John Wiley, New York, (2002).*

Stolen and Johnson, The effect of pulse walkoff on stimulated Raman scattering in fibers, IEEE Journal of Quantum Electronics, vol. 22, No. 11, pp. 2154-2160, (1986).*

Soko Kado et al., "Broadband flat-noise Raman amplifier using low-noise bi-directionally pumping sources", ECOC2001, Postdeadline papers, pp. 38-39, (2001).

M. Brunner at al., "Continuous-Wave Dual-Wavelength Lasing in a Two-Section Vertical-Cavity Laser", IEEE Photonics Technology Letters, vol. 12, No. 10, pp. 1316-1318, (2000).

Japanese Office Action, with English translation, issued in Japanese Patent Application No. JP 2003-054631 dated on Apr. 22, 2008.

Japanese Notice of Reasons for Rejection, w/ English translation thereof, issued in Japanese Patent Application No. JP 2003-054631 dated Apr. 1, 2009.

* cited by examiner

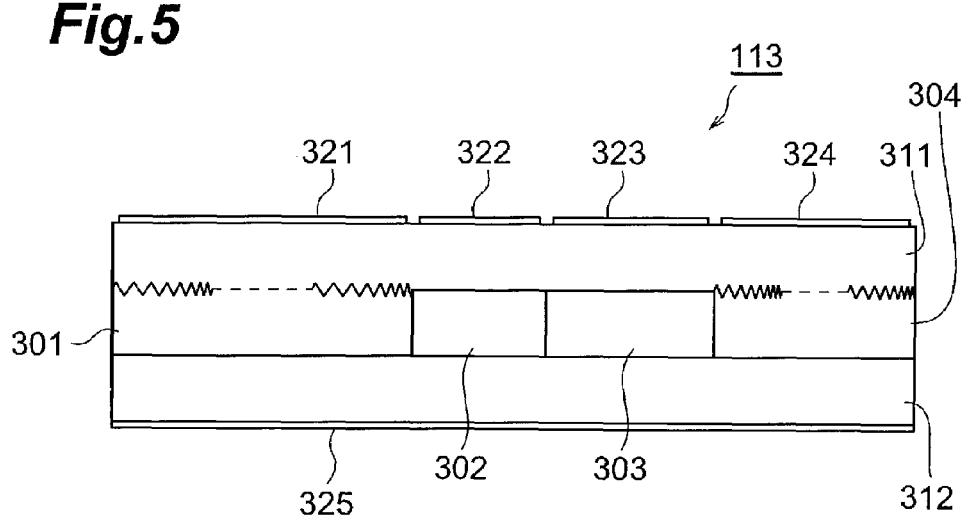
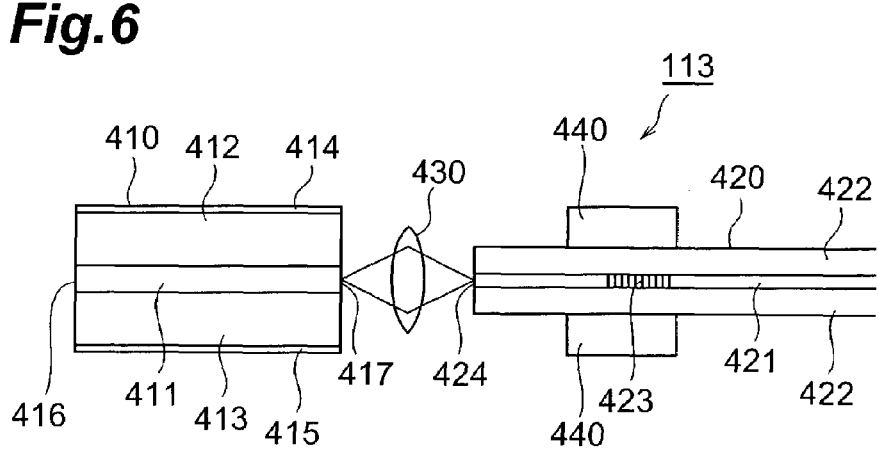

| WAVELENGTH | | WAVELENGTH CHANGE PATTERN A | WAVELENGTH CHANGE PATTERN B |
|---|---|---|---|
| $\lambda 1$ | TIME RATIO T1 | 1/7 | 3/7 |
| | POWER P1 | P | P/3 |
| | PRODUCT P1·T1 | P/7 | P/7 |
| $\lambda 2$ | TIME RATIO T2 | 6/7 | 4/7 |
| | POWER P2 | P | 3P/2 |
| | PRODUCT P2·T2 | 6P/7 | 6P/7 |

Fig.14

| | NO CHANGE | | WAVELENGTH CHANGE PATTERN C | | | MODULATION PATTERN D | | |
|---|---|---|---|---|---|---|---|---|
| | WAVELENGTH (nm) | POWER (dBm) | WAVELENGTH (nm) | POWER (dBm) | TIME RATIO | WAVELENGTH (nm) | POWER (dBm) | TIME RATIO |
| LIGHT SOURCE 213a | 1430 | 19.7 | 1425 | 16.7 | 1/3 | | | |
| | | | 1433 | 15.5 | 1/3 | 1433 | 16.0 | 1/2 |
| | | | 1441 | 15.1 | 1/3 | 1441 | 16.6 | 1/2 |
| LIGHT SOURCE 213b | 1456 | 18.0 | 1459 | 11.9 | 2/3 | 1459 | 10.1 | 1/7 |
| | | | 1467 | 15.3 | 1/3 | 1467 | 18.1 | 6/7 |
| TOTAL POWER OF LIGHT SOURCE 213a | | 19.7 | | 20.6 | | | 19.3 | |
| TOTAL POWER OF LIGHT SOURCE 213b | | 18.0 | | 17.0 | | | 18.7 | |
| SUM | | 21.9 | | 22.2 | | | 22.0 | |

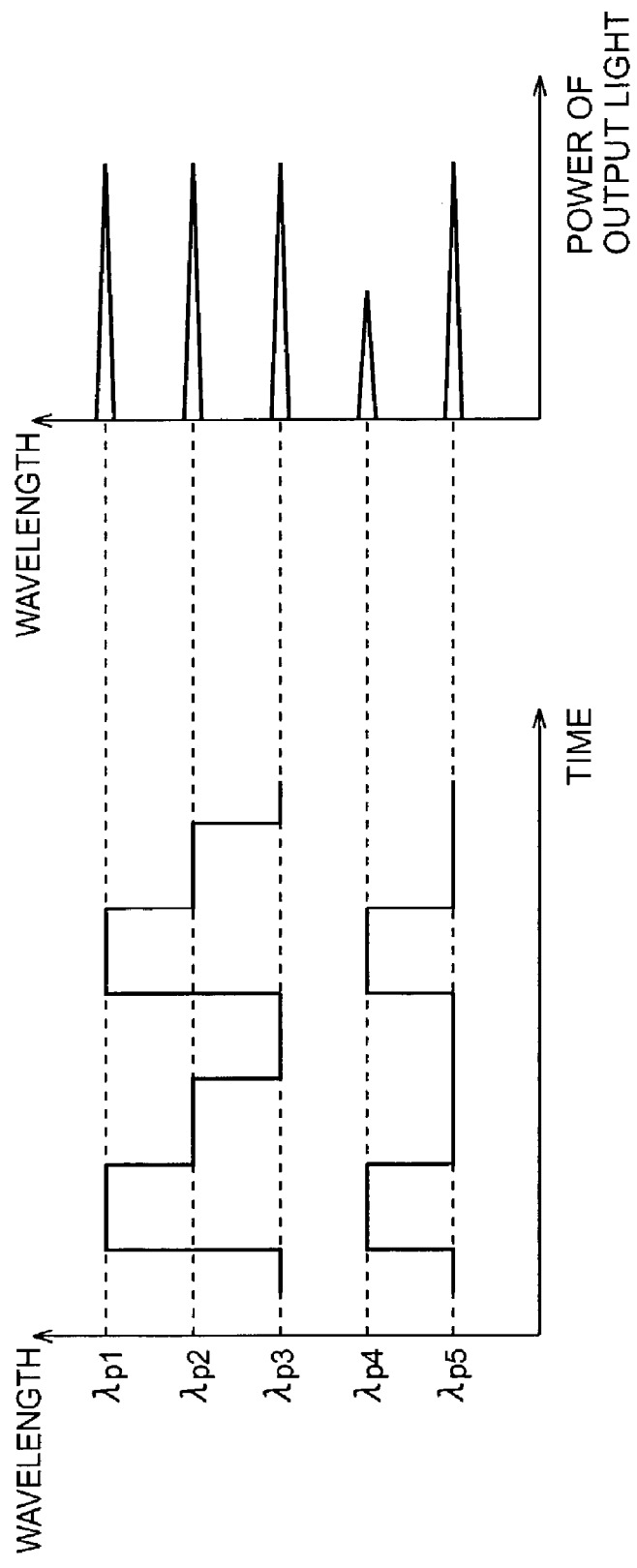

LIGHT GENERATOR, OPTICAL AMPLIFIER, AND OPTICAL COMMUNICATION SYSTEM

CROSS-REFERENCE TO RELATED APPLICATION

This application claims priority to Provisional Application Ser. No. 60/364,085 filed on Mar. 15, 2002, which is hereby incorporated by reference in its entirety.

BACKGROUND OF THE INVENTION

1. Field of the Invention

The present invention relates to a light generator suitable to a pumping light generator adapted to generate pumping light for signal amplification, an optical amplifier including the light generator, a control method using the optical amplifier, and an optical communication system including the optical amplification medium.

2. Related Background Art

An optical communication system transmits signal light through an optical fiber transmission line to implement large-capacity high-speed transmission of information. In this optical communication system, the signal light suffers loss during propagation through the optical fiber transmission line, and an optical amplifier for amplifying the signal light is used in order to compensate for the loss. The known optical amplifiers for this purpose include rare-earth-doped optical fiber amplifiers using an optical fiber doped with a rare earth element (e.g., Er), as an optical amplification medium, and Raman amplifiers making use of the stimulated Raman scattering phenomenon in the optical amplification medium. Among them, the Raman amplifiers are recently drawing attention, because they are effective to improvement in noise characteristics and the nonlinear optical phenomena of the optical communication system.

A Raman amplifier of this type is described, for example, in Document 1 "S. Kado, et al., "Broadband flat-noise Raman amplifier using low-noise bi-directionally pumping sources," ECOC'2001, Postdeadline papers, pp. 38-39 (2001)." In the Raman amplifier 1 described in this Document 1, the optical fiber as an optical amplification medium receives supply of 3-channel pumping light propagating in the same direction as the propagating direction of signal light and 5-channel pumping light propagating in the direction opposite to the propagating direction of the signal light. This supply of the pumping light of multiple channels into the optical amplification medium broadens and flattens a gain spectrum of amplification of signal light in the optical amplification medium. The optical amplifier with the broadband gain spectrum can be suitably applicable to a WDM (Wavelength Division Multiplexing) optical communication system for transmitting multiplexed signal light of multiple channels.

SUMMARY OF THE INVENTION

The inventors have studied conventional optical amplifiers in detail and, as a result, have found problems as follows. Namely, the optical amplifier, in which the pumping light of multiple channels is supplied into the optical amplification medium as described above, necessitates a number of pumping light sources. In other words, in the case where the pumping light of N1 channels are supplied in the forward direction into the optical amplification medium and the pumping light of N2 channels are supplied in the backward direction into the optical amplification medium, it is necessary to use at least (N1+N2) pumping light sources. Therefore, the pumping light generator for generating the pumping light becomes large in scale and expensive.

Semiconductor laser sources commonly used as pumping light sources normally lase at only one channel. The semiconductor laser sources can generate laser beams of two channels simultaneously, but lasing occurs only in the vicinity of a lasing threshold. Therefore, they cannot generate the laser light with satisfactory power for use as the pumping light (e.g., reference is made to Document 2 "M. Brunner, at al., "Continuous-Wave Dual-Wavelength Lasing in a Two-Section Vertical-Cavity Laser," IEEE Photonics Technology Letters, Vol. 12, No. 10, pp. 1316-1318 (2000)").

The present invention has been accomplished in order to solve the above problem, and an object of the invention is to provide a compact, inexpensive a light generator suitable to a pumping light generator, an optical amplifier using the light generator as the pumping light generator, a control method using the optical amplifier, and an optical communication system including the optical amplifier.

A light generator according to the present invention comprises a light source for emitting output light of variable wavelengths and changing means for changing a wavelength of light outputted from the light source or light in the light source. In particular, the changing means repeatedly changes the wavelength of light from the light source as time goes on. That is, the light generator outputs wavelength-changed light resulting from the change of wavelength by the changing means.

In a Raman amplification system of distributed type, in order to achieve an effective noise figure, a mean value over a predetermined period of total power of light outputted from the light source is preferably 88 mW or more, further 150 mW or more. In order to realize a high-stability in total output and effectively suppress SBS (Stimulated Brillouin Scattering), the output light preferably includes two or more axial modes. Further, by storing wavelength change patterns each corresponding to the changes with time of the output light into an inexpensive storage device, the repeat of changing can becomes easy. In this case, the changing means periodically changes the wavelength of light from the light source. A difference between a maximum wavelength and a minimum wavelength of the wavelength-changed light is preferably 4 nm or more. A spectrum of the wavelength-changed light preferably has two peaks center wavelengths of which are 26 nm or more apart from each other.

On the other hand, an optical amplifier according to the present invention comprises an optical amplification medium for signal amplification, the light generator (light generator according to the present invention) having the above-mentioned structure. Also, an optical communication system according to the present invention comprises the optical amplifier (optical amplifier according to the present invention) having the above-mentioned structure, an optical fiber transmission line transmitting the signal light and functioning as an optical amplification medium for signal amplification.

According to the present invention, the wavelength-changed light whose wavelength is repeatedly changed as time goes on by the changing means in the light generator is supplied as pumping light into the optical amplification medium. Signal light is amplified in the optical amplification medium with supply of the pumping light. Since this supply of the pumping light into the optical amplification medium is equivalent to virtually simultaneous supply of pumping light of multiple channels in the number over the number of light sources into the optical amplification medium, a desired gain spectrum can be readily obtained by the compact, inexpensive light generator. When the difference between the maximum wavelength of the minimum wavelength of the wavelength-changed light is 4 nm or more, the gain spectrum can be effectively changed by the supply of the wavelength-changed pumping light into the optical amplification medium. When the spectrum of the wavelength-changed light has two peaks the center wavelengths of which are 26 nm or more apart from each other, the optical amplifier can be suitably used together with an Er-doped optical fiber amplifier for amplifying the C-band or L-band signal light.

In the light generator according to the present invention, preferably, the light source includes N light source elements (N is an integer not less than 2), the changing means changes each of N wavelengths of lightwaves outputted from the light source elements or lightwaves in the light source elements. In this case, the light generator comprises an optical multiplexer for multiplexing the N wavelength-changed lightwaves and outputting the multiplexed light. Concerning two light source elements selected from the light source elements, a difference between wavelengths of their respective wavelength-changed lightwaves is preferably 4 nm or more. Concerning two light source elements selected from the light source elements, wavelength ranges of their respective wavelength-changed lightwaves preferably overlap each other at least in part.

As described above, the wavelength-changed lightwaves outputted from the light source elements are multiplexed by the optical multiplexer, and the multiplexed light may be supplied as the pumping light into the optical amplification medium. The increase in the number of light source elements each functioning a light source also increases degrees of freedom for adjustment of the gain spectrum of amplification of the signal light in the optical amplification medium. It is preferable that the wavelength ranges of the wavelength-changed lightwaves outputted from the two light sources overlap each other at least in part, because it is the redundant configuration adapted for failure in one of the N light source elements.

In the light generator according to the present invention, preferably, the light source comprises: a semiconductor light emitting device having a light reflecting surface and a light outputting surface on both sides of a photoactive layer which generates light with supply of a drive current, and an optical feedback device for reflecting part of light of a specific wavelength among light outputted from the light outputting surface of the semiconductor light emitting device to feed the reflected light back to the photoactive layer of the semiconductor light emitting device. In this aspect, the changing means may change the wavelength of output light by repeatedly changing the reflected light in the optical feedback device as time goes on. In another aspect, preferably, the light source may be a semiconductor light emitting device comprising a photoactive layer for generating light with supply of a drive current. In this aspect, the changing means may change the wavelength of output light by repeatedly changing the strength of the drive current supplied to the light source as time goes on. In another aspect, preferably, the light source may be a semiconductor light emitting device in which a photoactive layer for generating light with supply of a drive current, and a first optical feedback portion and a second optical feedback portion placed on both sides of the photoactive layer and resonating light of a specific wavelength, are integrated on a semiconductor substrate. In this aspect, the changing means may change the wavelength of output light by repeatedly changing the resonance wavelength in the first optical feedback portion and the second optical feedback portion as time goes on. Each of these aspects is suitable for outputting the wavelength-changed light from the light source.

In the light generator according to the present invention, preferably, the changing means has variable wavelength change patterns each corresponding to the change with time of the wavelength of output light. In this case, since the wavelength change pattern is adjusted on the occasion of variation in span loss upstream or downstream of the optical amplifier, the spectrum of the signal light outputted from the optical amplifier can be maintained as desired.

In the light generator according to the present invention, preferably, the changing means may change the power of the light outputted from the light source. In this case, since the output power is changed as well as the wavelength, the output from the light source becomes stable.

In the optical amplifier according to the present invention, preferably, traveling directions of the respective signal light and pumping light are opposite to each other in the optical amplification medium, and a frequency of wavelength change of the pumping light from the light generator is ten or more times greater than a frequency given by the inverse of a time for which the signal light propagates through an effective length of the optical amplification medium. In another aspect, preferably, traveling directions of the respective signal light and pumping light are identical to each other in the optical amplification medium, and a frequency of wavelength change of the pumping light from the light generator is ten or more times greater than a walkoff frequency determined from an effective length and chromatic dispersion of the optical amplification medium and a wavelength spacing between the signal light and the pumping light. In these configurations, during the process in which the signal light propagates through the part of the optical amplification medium where it can be effectively amplified, the signal light is subjected enough frequently and repeatedly to contributions from each of the pumping light of the multiple channels resulting from the wavelength change, so that the gain spectrum becomes stable on a temporal basis.

In the optical amplifier according to the present invention, preferably, a wavelength change pattern of the pumping light outputted from the light generator is set so as to flatten a spectrum of the signal light upon emergence from the optical amplification medium. This configuration can realize good signal transmission quality.

An optical amplifier control method according to the present invention is a method of, using the above-mentioned optical amplifier according to the present invention, calculating span loss variation before or after the optical amplifier and controlling a spectrum of output signal light from the optical amplifier to a predetermined pattern on the basis of the result of the calculation.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5 is a sectional view showing a configuration example of the light source included in the pumping light generator;

FIG. 6 is a sectional view showing another configuration example of the light source included in the pumping light generator;

FIG. 14 is a table showing powers of the pumping light of the respective wavelengths in an example of the wavelength change method in each of the light sources included in the pumping light generator;

FIGS. 17A and 17B shows wavelength ranges and power spectra of light outputted from the respective light sources included in the pumping light generator;

DETAILED DESCRIPTION OF THE PREFERRED EMBODIMENTS

Figure 1:
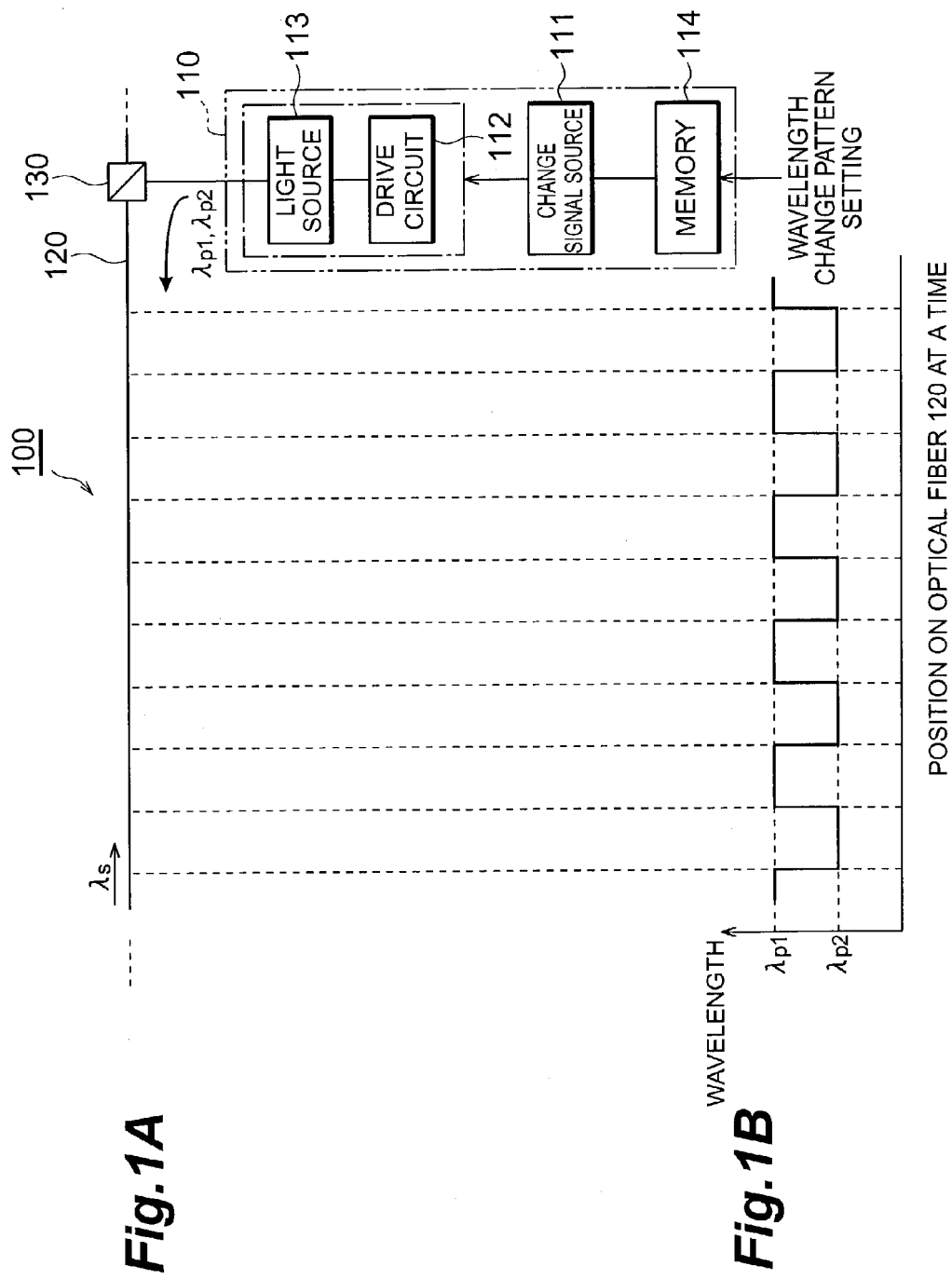
FIGS. 1A and 1B shows an illustration showing a first embodiment of the optical amplifier according to the present invention.

Embodiments of the present invention will be described below in detail with reference to FIGS. 1A, 1B, 2-6, 7A, 7B, 8-11, 12A, 12B, 13-16 and 17A-19B. The same reference symbols will denote the same elements and redundant description will be omitted throughout the description of the drawings.

First Embodiment

First, the first embodiment of the optical amplifier and the light generator (pumping light generator) according to the present invention will be described. FIGS. 1A and 1B shows an illustration showing the optical amplifier 100 according to the first embodiment. FIG. 1A shows the structure of the optical amplifier 100 and FIG. 1B shows a state at a certain time of wavelengths of the pumping light propagating at each position in the optical fiber 120 of an optical amplification medium. The optical amplifier 100 is generally comprised of the pumping light generator 110, the optical fiber 120, and an optical multiplexer/demultiplexer 130.

The optical fiber 120 is applied as an optical amplification medium for transmitting the signal light and Raman-amplifying the signal light. This optical fiber 120 may be a portion of an optical fiber transmission line installed in a repeater section in an optical communication system, or a modularized fiber wound in a coil form. The optical multiplexer/demultiplexer 130 supplies the pumping light reaching from the pumping light generator 110, into the optical fiber 120 and outputs the signal light coming from the optical fiber 120, toward downstream.

The pumping light generator 110 generates the pumping light to be supplied into the optical fiber 120 and comprises a change signal source 111, a drive circuit 112, and a light source 113. The light source 113 outputs light by the supply of a drive current from the drive circuit 112, and can change the wavelength of the output light. The change signal source 111 outputs a change signal for changing the wavelength of the light outputted from the light source 113. In the memory 114, a plurality of kinds of wavelength change patterns are previously stored. The change signal source 111 outputs the change signal into the drive circuit 112 in accordance with the wavelength change pattern previously determined out of the wavelength change patters stored in the memory 114.

In the optical amplifier 100, the change signal from the change signal source 111 is fed into the light source 113 or into the drive circuit 112. The wavelength of the light outputted from the light source 113 is changed based on the change signal. The wavelength-changed light from the light source 113 resulting from the wavelength change is outputted as the pumping light from the pumping light generator 110 and is supplied via the optical multiplexer/demultiplexer 130 into the optical fiber 120 in the direction opposite to the traveling direction of the signal light. Then the signal light is Raman-amplified in the optical fiber 120 with supply of the pumping light.

For example, in the case where the optical fiber 120 is mainly comprised of silica-based glass, the signal light (wavelengths $\lambda s$) includes multiple channels in the C-band, and the wavelengths $\lambda p$ of the pumping light are about 100 nm shorter than the wavelengths $\lambda s$ of the signal light. The wavelengths $\lambda p$ of the pumping light outputted from the pumping light generator 110 are changed in the vicinity of 1.45 μm.

In FIGS. 1A and 1B, the pumping light outputted from the pumping light generator 110 is changed into one of wavelength $\lambda p1$ and wavelength $\lambda p2$. Namely, as shown in FIG. 2, the pumping light of the wavelength $\lambda p1$ and the pumping light of the wavelength $\lambda p2$ is supplied timewise alternately from the pumping light generator 110 into the optical fiber 120. When the state of the wavelengths of the pumping light propagating at each position in the optical fiber 120 is observed at a predetermined time, regions with the pumping light of the wavelength λp1 propagating and regions with the pumping light of the wavelength λp2 propagating are alternated along the longitudinal direction of the optical fiber 120, as shown in FIG. 1B.

The signal light propagating in the optical fiber 120 is Raman-amplified based on the stimulated Raman scattering (SRS) phenomenon by the wavelength-changed pumping light traveling in the opposite direction. A gain spectrum of Raman amplification of the signal light in the optical fiber 120 is the sum of contributions from the pumping light of the wavelength λp1 and from the pumping light of the wavelength λp2. Accordingly, in this optical amplifier 100, the pumping light wavelength-changed and outputted from the single light source 113 is supplied into the optical fiber 120, which is equivalent to virtually simultaneous supply of pumping lightwaves of two wavelengths into the optical fiber 120. Therefore, a desired gain spectrum can be readily obtained by the compact, inexpensive pumping light generator 110.

When power of light outputted from the pumping light generator 110 is too weak, the output light can not be used as a Raman amplification pumping light. For example, Raman-amplification in 80-km transmission line, which is often used in a ground main line system employing a silica-based single-mode optical fiber (SMF) with a zero-dispersion wavelength in 1.3 μm wavelength band, is considered.

When on-off gain of a distributed Raman amplifier $G_1$, noise figure (NF) is $F_1$, insertion loss of optical devices such as pumping light/signal light multiplexing coupler for distributed Raman amplifier, isolator, output, branching coupler for reflection monitor, and so on is L1, and further when net gain and NF of conventional EDFA are $G_2$ and $F_2$, respectively, Ft as an effective NF in Raman amplification is given by the following expression (1):

$$F_t = \left(F_1 - \frac{1}{G_1}\right) + \frac{L_1}{G_1}\left(F_2 - \frac{1}{G_2}\right) + \frac{L_1}{G_1 \cdot G_2}. \quad (1)$$

Assuming $G_2$ is large, $F_1$ is 0 dB, $F_2$ is 6 dB, and $L_1$ is about 1.5 dB (typical insertion loss of each device is 0.5 dB), $F_t$ as an effective NF becomes worse rather than the conventional EDFA in Raman amplification at 1.9 dB or less of the on-off gain $G_1$. The insertion loss includes variation, but the variation range is about ±0.3 dB. Therefore, a possibility that $L_1$ achieves 2.4 dB is remarkably low. Accordingly, when G1 is over 2.8 dB (=1.9 dB+0.9 dB), it can be considered that an effect of Raman amplification can be obtained even if the insertion loss is large.

The relationship between on-off gain G (dB) and pumping light power (mW) at the output end of SMF is given by the following expression (2):

$$G(\text{dB})/P(\text{mW}) = \frac{10}{\ln 10} \cdot \frac{g_R}{A_{\text{eff}}} \cdot \frac{1-\exp(-\alpha_p \cdot L)}{\alpha_p} \times 1000. \quad (2)$$

Here, $g_R/A_{\text{eff}}$ and $\alpha_p$ are a Raman gain coefficient of SMF and a insertion loss in the pumping light wavelength band. If the wavelength of the pumping light is set at 1.45 μm for amplification of the most-used C-band signal, $\alpha_p$ becomes 025 dB/km. Also, the Raman gain coefficient is 3.7E-4(1/W/m). As a result, from the above expression (2), a differential gain in the 80-km SMF transmission line becomes 0.027 dB/mW. Accordingly, in order to achieve the above value of the on-off gain, the power of the pumping light necessaries at least 70 mW (=1.9/0.027), further 111 mW while considering deviation.

When the pumping light multiplexer is constituted by polarization multiplexer (or depolarizer) and wavelength multiplexer, its insertion loss is at least 1 dB. Therefore, the pumping light necessaries a power of 88 mW, preferably 150 mW.

Figure 3:
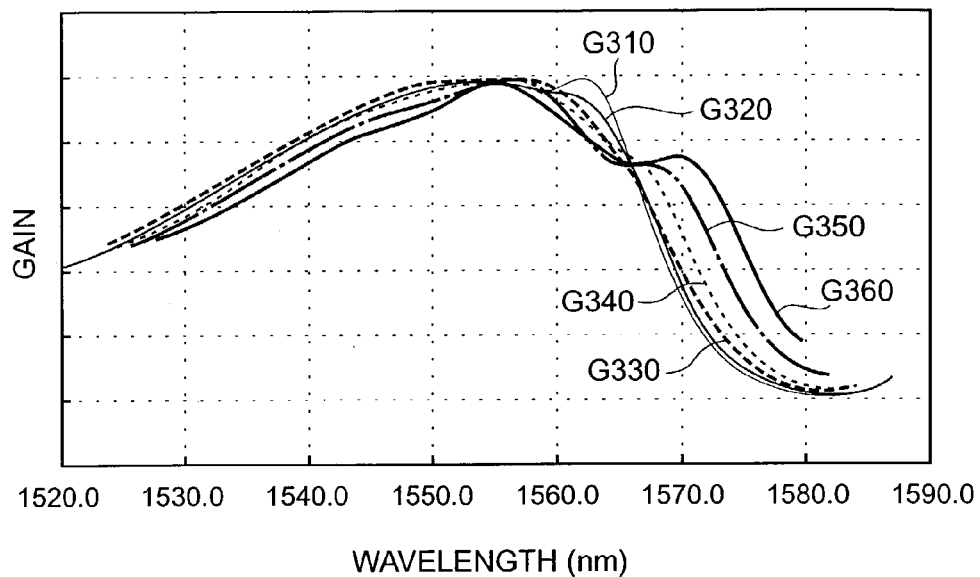
FIG. 3 shows gain spectra at respective values of difference $\Delta\lambda$ between wavelength $\lambda p1$ and wavelength $\lambda p2$.
Figure 4:
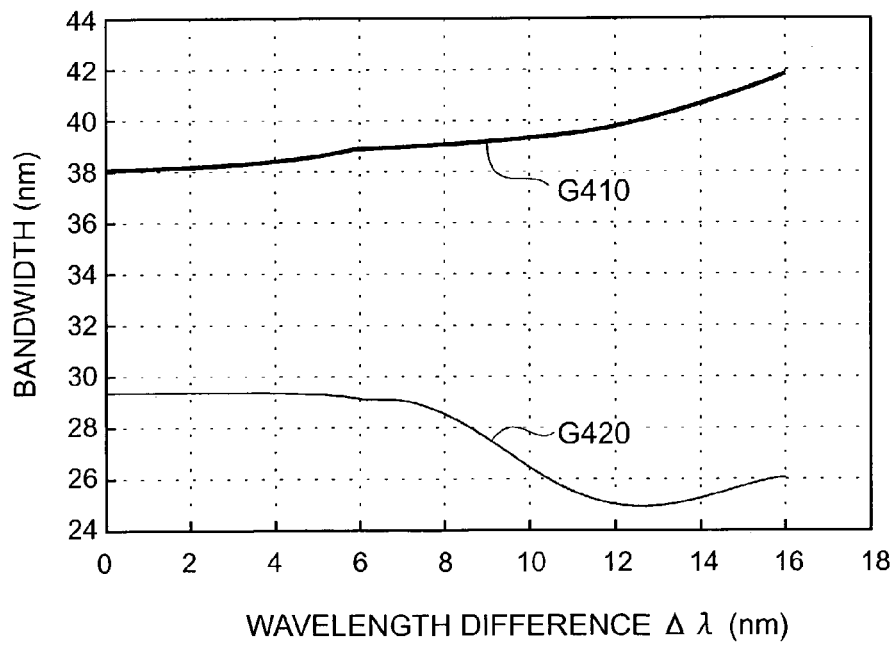
FIG. 4 is a graph showing a relationship between bandwidth and wavelength difference $\Delta\lambda$ of gain spectra.

FIG. 3 shows gain spectra at respective values of the difference Δλ between the wavelength $\lambda_{p1}$ and the wavelength $\lambda_{p2}$. In FIG. 3, the curve G310 indicates the gain spectrum at the wavelength difference Δλ=0 nm (corresponding to the case of non-wavelength change), the curve G320 indicates a gain spectrum at the wavelength difference Δλ=2 nm, the curve G330 indicates a gain spectrum at the wavelength difference Δλ=3 nm, the curve G340 indicates a gain spectrum at the wavelength difference Δλ=4 nm, the curve G350 indicates a gain spectrum at the wavelength difference Δλ=5 nm, and the curve G360 indicates a gain spectrum at the wavelength difference Δλ=6 nm. FIG. 4 is a graph showing the relationship between the bandwidth and the wavelength difference Δλ of the gain spectra. In FIG. 4, the curve G410 indicates the bandwidth of the gain spectrum at 83% of the peak value, and the curve G420 indicates the bandwidth of the gain spectrum at 70% of the peak value. As seen from these graphs, the gain spectrum by the wavelength-changed pumping light with the small wavelength difference Δλ has little difference from the gain spectrum by the pumping light of the single wavelength without wavelength change. In order to change the gain spectrum with the supply of the wavelength-changed pumping light into the optical fiber 120, the wavelength difference Δλ is preferably 4 nm or more.

For stabilizing the gain spectrum of Raman amplification of the signal light on a temporal basis, the signal light is preferably subjected as frequently and repetitively as possible to the contributions from the pumping light of the wavelength $\lambda_{p1}$ and from the pumping light of the wavelength $\lambda_{p2}$ during the process in which the signal light propagates through the portion of the optical fiber 120 where it can be effectively Raman-amplified. Namely, the frequency of the wavelength change of the pumping light outputted from the pumping light generator 110 is preferably as high as possible.

Figure 2:
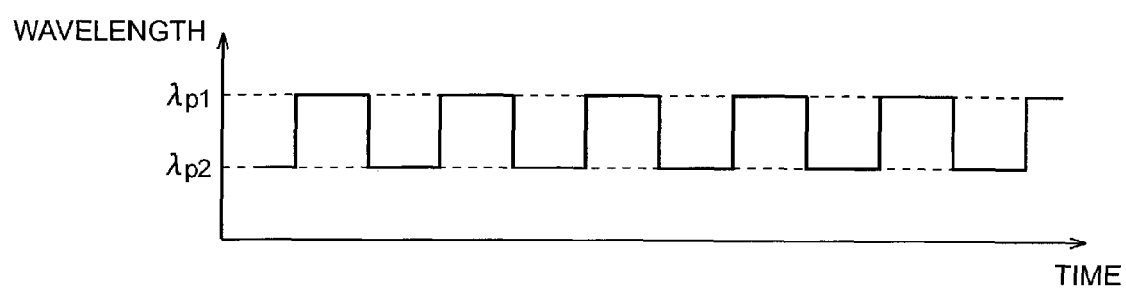
FIG. 2 is a time chart for explaining the change with time (wavelength change pattern) of wavelengths of the pumping light outputted from the pumping light generator according to the first embodiment.

In the case of the supply of the pumping light propagating in the direction opposite to the propagating direction of the signal light, as shown in FIG. 1, the frequency of the wavelength change of the pumping light outputted from the pumping light generator 110 is preferably ten or more times greater than a frequency given by the inverse of a time for which the signal light propagates through the effective length of the optical fiber 120. Let $\alpha_p$ be a transmission loss of the optical fiber 120 at a time-averaged wavelength of the wavelength-changed pumping light, and L be a physical length of the optical fiber 120. Then the effective length $L_{\text{eff}}$ of the optical fiber 120 is given by the following expression (3):

$$L_{\text{eff}}=(1-\exp(-\alpha_p \cdot L))/\alpha_p \quad (3).$$

For example, let us suppose that the optical fiber 120 is a standard single-mode optical fiber with the zero-dispersion wavelength near the wavelength of 1.3 μm, the time-averaged wavelength of the pumping light is 1450 nm, and the physical length L of the optical fiber 120 is 80 km. Then the effective length $L_{\text{eff}}$ is approximately 17.9 km and the time necessary for the signal light to propagate through the effective length Leff is approximately 87 μs. Accordingly, the frequency of the wavelength modulation of the pumping light is preferably ten or more times greater than the frequency given by the inverse of this time of 87 µs, i.e., 115 kHz or more, in order to stabilize the gain spectrum of Raman amplification of the signal light on a temporal basis.

On the other hand, in the case where the pumping light is supplied so as to propagate in the same direction as the propagating direction of the signal light, the frequency of the wavelength change of the pumping light outputted from the pumping light generator 110 is preferably ten or more times greater than the walkoff frequency determined from the effective length and chromatic dispersion of the optical fiber 120 and the wavelength spacing between the signal light and the pumping light. Let D be a chromatic dispersion value at a median between rms center wavelengths of the respective pumping light and signal light, and $\Delta\lambda_{s\text{-}p}$ be a wavelength spacing between the longest wavelength of the pumping light and the shortest wavelength of the signal light. Then the walkoff frequency $f_w$ is given by the following expression (4):

$$f_w = 1/(D \cdot L_{\mathit{eff}} \cdot \Delta\lambda_{s\text{-}p}) \tag{4}$$

For example, let us suppose that the optical fiber 120 is a standard single-mode optical fiber having the zero-dispersion wavelength near the wavelength of 1.3 µm, the time-averaged wavelength of the pumping light is 1450 nm, and the physical length L of the optical fiber 120 is 80 km. Then the effective length $L_{\mathit{eff}}$ is approximately 17.9 km and the wavelength dispersion value D approximately 11 ps/nm/km. When the wavelength spacing $\Delta\lambda_{s\text{-}p}$ is 70 nm, the walkoff frequency $f_w$ is about 72 MHz. Accordingly, the frequency of the wavelength change of the pumping light is preferably ten or more times greater than the walkoff frequency $f_w$, i.e., 720 MHz or more, in order to stabilize the gain spectrum of Raman amplification of the signal light on a temporal basis.

The following will describe a preferred configuration example of the light source 113 included in the pumping light generator 110. FIG. 5 is a sectional view showing the configuration example of the light source 113 included in the pumping light generator 110. The light source 113 shown in this figure is a semiconductor light emitting device in which a first optical feedback portion 301, a phase adjusting portion 302, a photoactive layer 303, and a second optical feedback portion 304 are integrated between a first cladding layer 311 and a second cladding layer 312 on a semiconductor substrate. Electrodes 321 to 324 are laid on the upper surface of the first cladding layer 311, and an electrode 325 on the lower surface of the second cladding layer 312. The phase adjusting portion 302 and the photoactive layer 303 are placed between the first optical feedback portion 301 and the second optical feedback portion 304.

The first optical feedback portion 301 has a diffractive grating of super-period structure at the interface to the first cladding layer 311, and a reflection spectrum thereof has discrete reflectance peak wavelengths. The first optical feedback portion 301 changes its refractive index according to the strength of an electric current flowing between the electrode 321 and the electrode 325, thereby shifting the reflectance peak wavelength. Likewise, the second optical feedback portion 304 has a diffractive grating of super-period structure at the interface to the first cladding layer 311 and a reflection spectrum thereof has discrete reflectance peak wavelengths. The second optical feedback portion 304 changes its refractive index according to the strength of an electric current flowing between the electrode 324 and the electrode 325, thereby shifting the reflectance peak wavelength.

When a drive current flows between the electrode 323 and the electrode 325, the photoactive layer 303 emits light. A lightwave of a specific wavelength among the light resonates in a resonator consisting of the first optical feedback portion 301 and the second optical feedback portion 304 to be outputted from the second optical feedback portion 304 to the outside. The wavelength of the light outputted from the second optical feedback portion 304 of the light source 113 to the outside is determined by the reflection spectra of the feedback portions 301, 304 according to the strength of the electric currents supplied to the electrodes 321, 324 and is finely adjusted by change of the refractive index of the phase adjusting portion 302 according to the strength of the electric currents supplied to the electrode 322. The change signal outputted from the change signal source 111, as time goes on, repeatedly changes the strength of the electric currents supplied to these electrodes or the resonance wavelength in the first optical feedback portion 301 and the second optical feedback portion 304, thereby changing the wavelength of the output light. The width of the wavelength change of the output light can range up to about 100 nm. Since this light source 113 includes no mechanically moving portion, the frequency of the wavelength change of the output light can be set up to several hundred MHz.

FIG. 6 is a sectional view showing another configuration example of the light source 113 included in the pumping light generator 110. The light source 113 shown in this figure has a semiconductor light emitting device 410, an optical feedback device 420, a lens 430, and changing means 440. In the semiconductor light emitting device 410, a photoactive layer 411 is placed between a first cladding layer 412 and a third cladding layer 413, and the photoactive layer 411 generates light with supply of a drive current between electrode 414 and electrode 415. A light reflecting surface 416 on one side of the photoactive layer 411 reflects light at a high reflectance. A light outputting surface 417 on the other side of the photoactive layer 411 transmits light at a high transmittance.

The optical feedback device 420 is an optical fiber including a core region 421 and a cladding region 422, in which a diffractive grating 423 of index change is formed in a certain region along the longitudinal direction of the core region 421. The optical feedback device 420 reflects part of light of a specific wavelength among the light propagating in the core region 421 by Bragg reflection to feed the reflected light back into the photoactive layer 411 of the semiconductor light emitting device 410. The lens 430 condenses the light emerging from the light outputting surface 417 of the semiconductor light emitting device 410 and feeds it through an end face 424 of the optical feedback device 420 into the core region 421. Further, the lens 430 condenses the light emerging from the end face 424 of the optical feedback device 420 and feeds it through the light outputting surface 417 of the semiconductor light emitting device 410 into the photoactive layer 411.

In this light source 113, the light reflecting surface 416 of the semiconductor light emitting device 410 and the diffractive grating 423 of the optical feedback device 420 constitute an external resonator, and the resonance wavelength thereof is determined by the reflected wavelength at the diffractive grating 423. The reflected wavelength at the diffractive grating 423 can be adjusted by temperature adjustment or tension addition of the changing means 440. Namely, in accordance with the changing signal outputted from the changing signal source 111, the changing means 440 changes the temperature or tension of the diffractive grating 423 to change the reflected wavelength at the diffractive grating 423, thereby changing the wavelength of the output light.

Figure 7A:
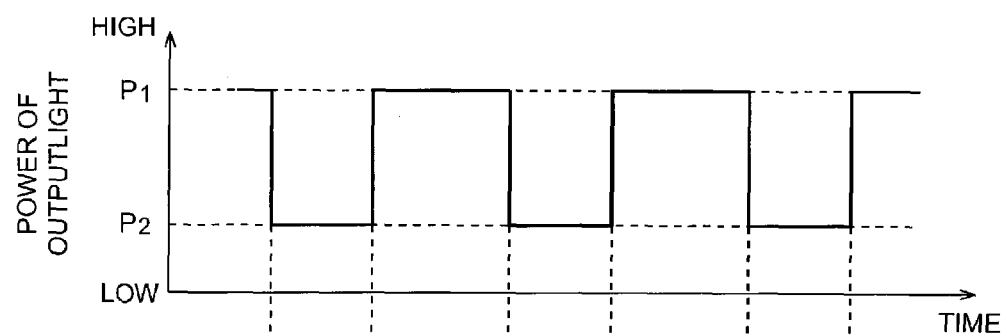
FIGS. 7A and 7B are time charts for explaining an example of the wavelength change method of the light source included in the pumping light generator.
Figure 7B:
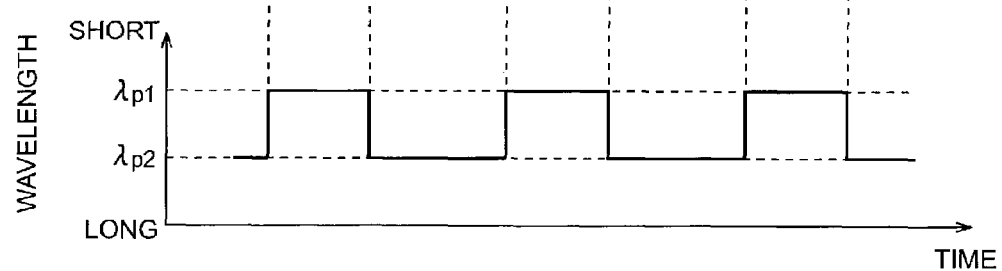

FIGS. 7A and 7B are time charts showing an example of the wavelength change method of the light source 113 included in the pumping light generator 110. As shown in this figure, a preferred method of the wavelength change of the output light in the light source 113 is a method of using the semiconductor light emitting device including the photoactive layer for generating light with supply of the drive current, as the light source 113 and changing the strength of the drive current supplied to the light source 113 to change the wavelength of the light outputted from the light source 113. Namely, the light source 113 of the semiconductor light emitting device shifts its peak wavelength of spontaneous emission emitted in the photoactive layer, to the longer wavelength side when the supplied drive current is large. By making use of this property, the large drive current is supplied in order to change the wavelength of the output light to the longer wavelength side, whereas the small drive current is supplied in order to change the wavelength of the output light to the shorter wavelength side (see FIG. 7A). This results in changing the wavelength of the light outputted from the light source 113 (see FIG. 7B).

In the light source 113 shown in FIG. 6, the change of the strength of the drive current as shown in FIGS. 7A and 7B may be effected in synchronism with the change of the reflected wavelength at the diffractive grating 423 by the temperature adjustment or the tension application. Execution of this synchronized modulation stabilizes the lasing if the peak wavelength of spontaneous emission emitted in the photoactive layer 411 approximately agrees with the center reflected wavelength at the diffractive grating 423.

Figures 8, 9:
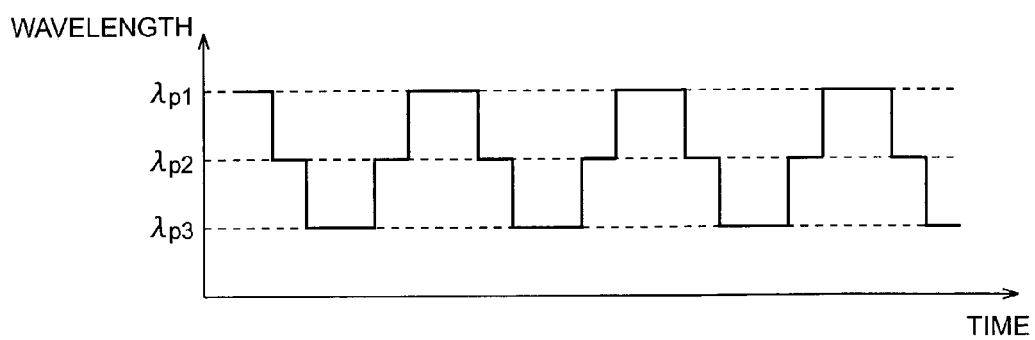
FIG. 8 is a table showing the relationship between powers and time ratios of the pumping light of the respective wavelengths in the example of the wavelength change method of the light source included in the pumping light generator.
FIG. 9 is a time chart for explaining the change with time (wavelength change pattern) of wavelengths of the pumping light outputted from the pumping light generator.

In the wavelength change method of the light source 113 shown in FIGS. 7A and 7B, the power of the pumping light is also changed by the change of the strength of the drive current. In the case where the power of the pumping light is also changed in this way, it is preferable to determine time ratios $T_1$, $T_2$ so that each of product $P_1 T_1$ and product $P_2 T_2$ becomes constant, where $T_1$ is a time ratio of output of the pumping light of the wavelength $\lambda_{p1}$ and $T_2$ a time ratio of output of the pumping light of the wavelength $\lambda_{p2}$. For example, as shown in FIG. 8, let us assume such a wavelength change pattern A that for the pumping light of the wavelength $\lambda_{p1}$ the time ratio $T_1$ is 1/7 and the power $P_1$ is P and that for the pumping light of the wavelength $\lambda_{p2}$ the time ratio $T_2$ is 6/7 and the power $P_2$ is P. Furthermore, let us assume such another wavelength change pattern B that for the pumping light of the wavelength $\lambda_{p1}$ the time ratio $T_1$ is 3/7 and the power $P_1$ is P/3 and that for the pumping light of the wavelength $\lambda_{p2}$ the time ratio $T_2$ is 4/7 and the power $P_2$ is 3P/2. In both of the wavelength change patterns A and B, the product $P_1 T_1$ for the pumping light of the wavelength $\lambda_{p1}$ is constant, P/7, and the product $P_2 T_2$ for the pumping light of the wavelength $\lambda_{p2}$ is also constant, 6P/7.

Figure 10:
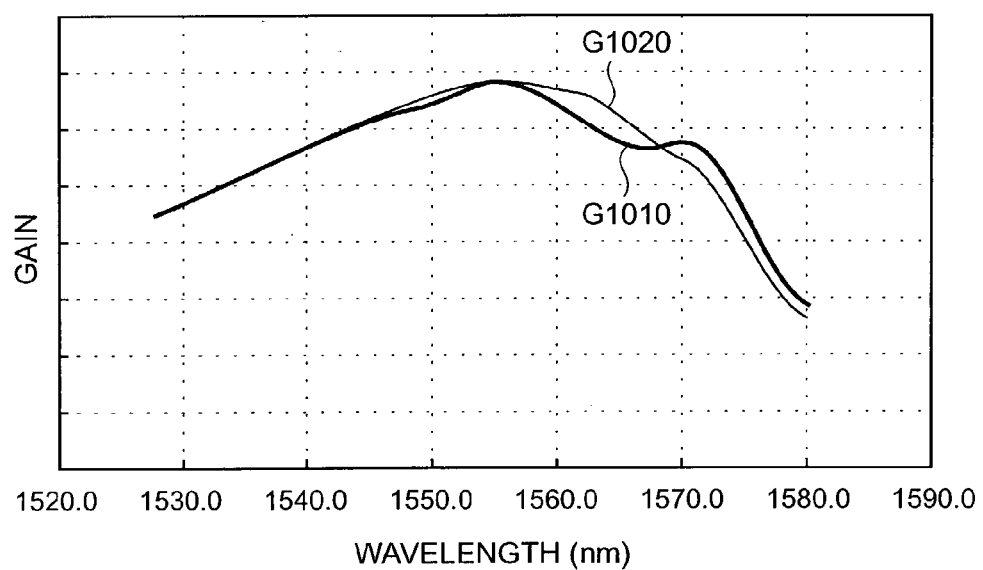
FIG. 10 shows gain spectra of amplification of signal light with supply of the pumping light of two-channel change and three-channel change into the optical fiber.

In the above description, the pumping light outputted from the pumping light generator 110 was the wavelength-changed light outputted in either of the two wavelengths $\lambda_{p1}$ and $\lambda_{p2}$ (see FIG. 2). However, the pumping light outputted from the pumping light generator 110 does not have to be limited to the change in two channels, but it may be changed in three or more channels. FIG. 9 is a diagram to illustrate another example of change with time in the wavelength of the pumping light outputted from the pumping light generator 110. In the wavelength change pattern shown in this figure, the pumping light outputted from the pumping light generator 110 is outputted in either of three wavelengths $\lambda_{p1}$, $\lambda_{p2}$, and $\lambda_{p3}$. As shown in FIGS. 7A, 7B and 9, in the case of periodically changing the wavelength of pumping light to be outputted, it is preferable a change signal can be easily obtained by a simple electronic circuit such as an oscillator. FIG. 10 shows gain spectra of amplification of the signal light with supply of the pumping light (G1010) resulting from the two-channel change and the pumping light (G1020) resulting from the three-channel change, into the optical fiber 120. In the case of the two-channel change (FIG. 2) the wavelengths of the pumping light were 1444 nm and 1460 nm. In the case of the three-channel change (FIG. 9) the wavelengths of the pumping light were 1444 nm, 1452 nm, and 1460 nm. As seen from this figure, the gain spectrum is smoother in the shape without a ripple in the case of the three-channel change than in the case of the two-channel change.

Second Embodiment

Figure 11:
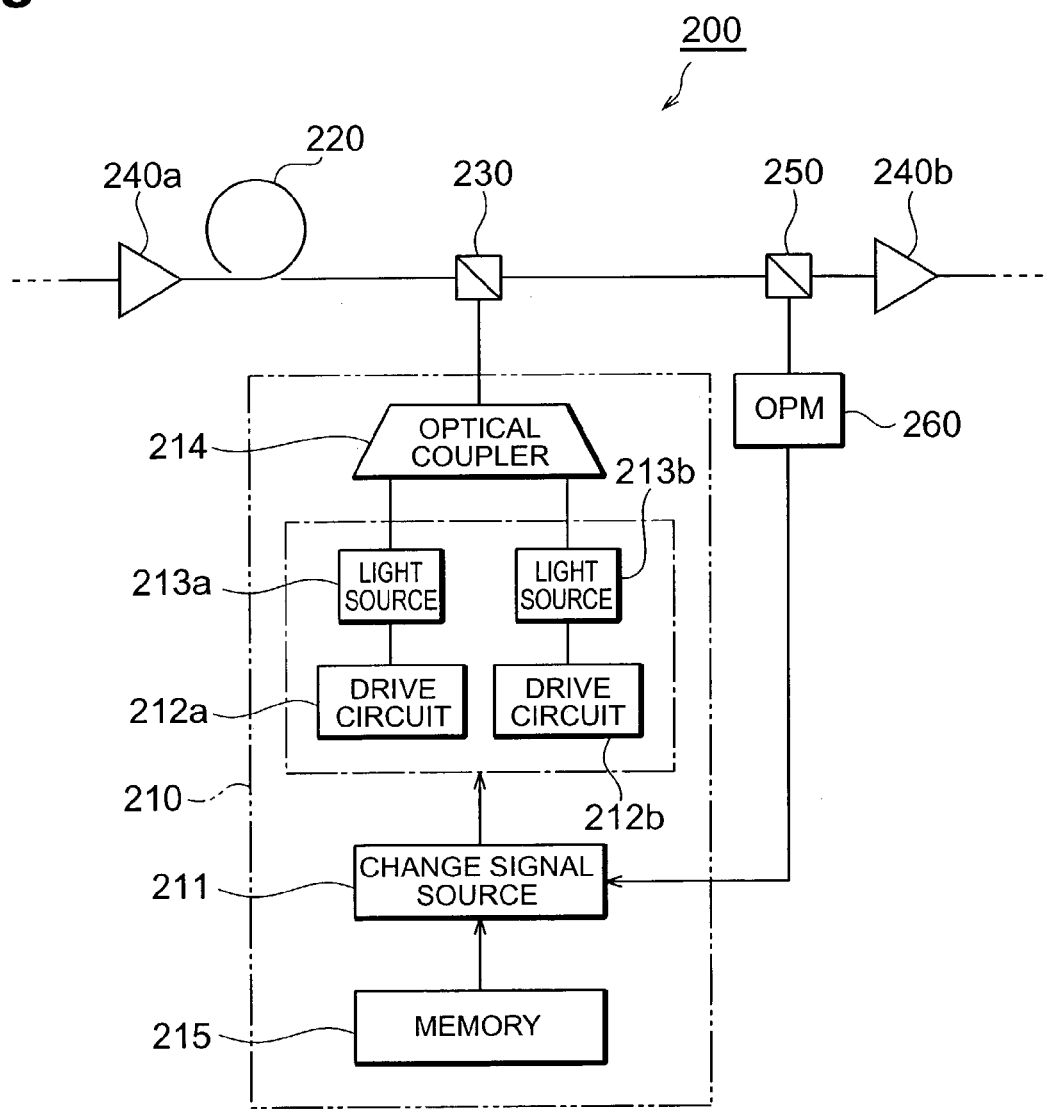
FIG. 11 is an illustration showing a second embodiment of the optical amplifier according to the present invention.

The following will describe the second embodiment of the optical amplifier and the light generator (pumping light generator) according to the present invention. FIG. 11 is an illustration showing the optical amplifier 200 according to the second embodiment. This optical amplifier 200 comprises a pumping light generator 210, an optical fiber 220, an optical multiplexer/demultiplexer 230, an EDFA 240a, an EDFA 240b, an optical branching device 250, an optical performance monitor 260, and memory 215.

The optical fiber 220 is used as an optical amplification medium for transmitting signal light and also Raman-amplifying the signal light. This optical fiber 220 may be a portion of an optical fiber transmission line installed in a repeater section in an optical communication system, or a modularized fiber wound in a coil form. This optical fiber 220 has a negative chromatic dispersion at wavelengths of the signal light, and compensates for a positive chromatic dispersion of a single-mode optical fiber commonly used as an optical fiber transmission line. Since the optical fiber 220 with a negative dispersion normally has a small effective area, it is advantageous in causing the stimulated Raman scattering phenomenon which is a kind of the nonlinear optical phenomena. The optical multiplexer/demultiplexer 230 supplies the pumping light reaching from the pumping light generator 210, into the optical fiber 220 and outputs the signal light coming from the optical fiber 220, toward the optical branching device 250.

The pumping light generator 210 generates the pumping light to be supplied into the optical fiber 220 and comprises a change signal source 211, drive circuits 212a, 212b, light sources 213a, 213b, an optical multiplexer 214, and memory 215. The light source 213a outputs light with supply of a drive current from the drive circuit 212a and the output light thereof has variable wavelengths. Likewise, the light source 213b outputs light with supply of a drive current from the drive circuit 212b and the output light thereof has variable wavelengths. The optical multiplexer 214 multiplexes wavelength-changed lightwaves outputted from the respective light sources 213a, 213b and outputs the multiplexed light as the pumping light. The change signal source 211 outputs a change signal for modulating the wavelengths of the light emitted from each of these light sources 213a, 213b. The wavelength change patterns to be referred are stored into the memory 215. The structure and wavelength change method of each of the light sources 213a, 213b are similar to those previously described in the first embodiment.

The EDFA 240a is disposed upstream of the optical fiber 220, while the EDFA 240b downstream of the optical fiber 220. Each of the EDFAs (Erbium-Doped Fiber Amplifiers) 240a, 240b is a rare-earth-doped optical fiber amplifier using an optical fiber doped with Er, as an optical amplification medium. Each of these EDFAs 240a, 240b can amplify the C-band or L-band signal light in the rare-earth-doped optical fiber when the pumping light in the 0.98 μm wavelength band or 1.48 μm wavelength band is supplied into the rare-earth-doped optical fiber.

The optical branching device 250 is disposed on the path of the signal light between the optical fiber 220 and the EDFA 240b and functions to split the signal light from the optical fiber 220 to extract part thereof and output the extracted signal light toward the optical performance monitor 260. The optical performance monitor 260 receives input of the signal light coming from the optical branching device 250, measures a spectrum of the signal light, and sends the result of the measurement to the change signal source 211.

In the optical amplifier 200, the change signal outputted from the change signal source 211 is supplied into the light sources 213a, 213b or into the drive circuits 212a, 212b. The wavelengths of lightwaves outputted from the respective light sources 213a, 213b are changed based on this change signal. The wavelength-changed lightwaves outputted from the respective light sources 213a, 213b after the wavelength change are multiplexed by the optical multiplexer 214, the multiplexed lightwaves are outputted as the pumping light from the pumping light generator 210, and the pumping light is supplied through the optical multiplexer/demultiplexer 230 into the optical fiber 220 in the direction opposite to the traveling direction of the signal light. Then the signal light is Raman-amplified in the optical fiber 220 with the supply of the pumping light.

In this optical amplifier 200, the signal light is amplified by each of the upstream EDFA 240a, the middle optical fiber 220, and the downstream EDFA 240b. Accordingly, the total gain spectrum of amplification of the signal light through the entire optical amplifier 200 is the sum of gain spectra of the respective EDFA 240a, optical fiber 220, and EDFA 240b.

Further, in the optical amplifier 200, the optical performance monitor 260 measures the spectrum of the signal light outputted from the optical fiber 220. Then the wavelength change of the pumping light outputted from the pumping light generator 210 is controlled based on the result of the measurement. Through this control, the gain spectrum of Raman amplification of the signal light in the optical fiber 220 is adjusted into a desired one and the total gain spectrum of amplification of the signal light through the entire optical amplifier 200 is also adjusted into a desired one.

Figure 12:
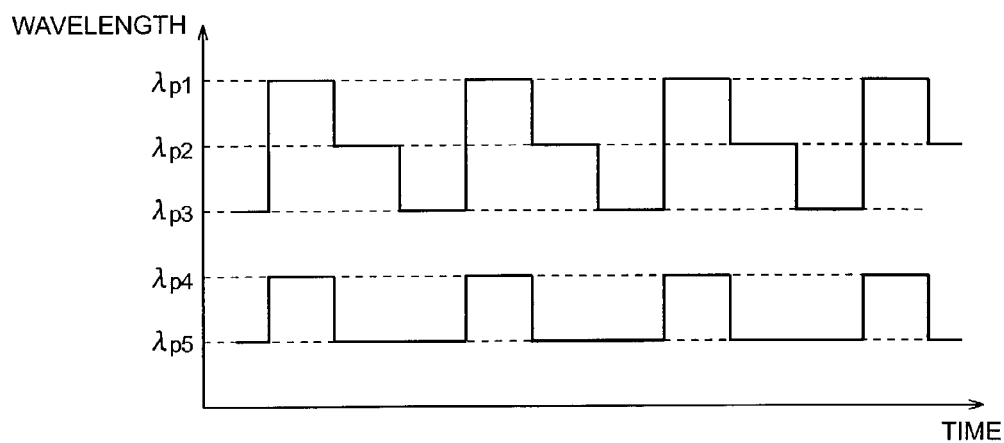
FIG. 12 is a time chart for explaining the change with time of wavelengths of the pumping light outputted from the pumping light generator in the optical amplifier according to the second embodiment.

FIG. 12 is a time chart for explaining the change with time of wavelengths of the pumping light outputted from the pumping light generator 210 of the optical amplifier 200 according to the second embodiment. The pumping light of each of the wavelengths $\lambda_{p1}$, $\lambda_{p2}$, and $\lambda_{p3}$ is supplied timewise alternately from the light source 213a of the pumping light generator 210 into the optical fiber 220. The pumping light of each of the wavelengths $\lambda_{p4}$ and $\lambda_{p5}$ is supplied timewise alternately from the light source 213b of the pumping light generator 210 into the optical fiber 220. When the state of the wavelengths of the pumping light propagating at each position of the optical fiber 220 is observed at a predetermined time, regions with the pumping light of the wavelength $\lambda_{p1}$ propagating, regions with the pumping light of the wavelength $\lambda_{p2}$ propagating, and regions with the pumping light of the wavelength $\lambda_{p3}$ propagating alternately appear in order along the longitudinal direction of the optical fiber 220. At the same time, regions with the pumping light of the wavelength $\lambda_{p4}$ propagating and regions with the pumping light of the wavelength $\lambda_{p5}$ propagating alternately appear in order along the longitudinal direction of the optical fiber 220.

The signal light propagating in the optical fiber 220 is Raman-amplified based on the stimulated Raman scattering phenomenon by the wavelength-changed pumping light traveling in the opposite direction. The gain spectrum of Raman amplification of the signal light in the optical fiber 220 is the sum of contributions from the respective pumping lightwaves of the wavelengths $\lambda_{p1}$ to $\lambda_{p5}$. Therefore, in this optical amplifier 200, the pumping light wavelength-changed and outputted from the respective two light sources 213a, 213b is supplied into the optical fiber 220, which is equivalent to virtually simultaneous supply of pumping lightwaves of the five wavelengths into the optical fiber 220, and thus the desired gain spectrum can be readily obtained by the compact, inexpensive pumping light generator 210.

Figure 13:
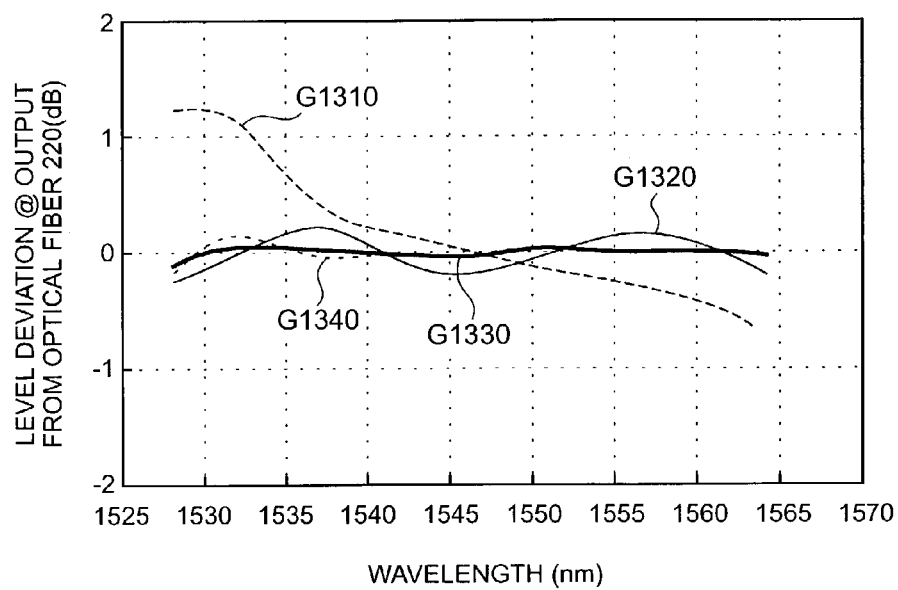
FIG. 13 shows spectra of the signal light outputted from the optical fiber in the optical amplifier according to the second embodiment.
Figure 15:
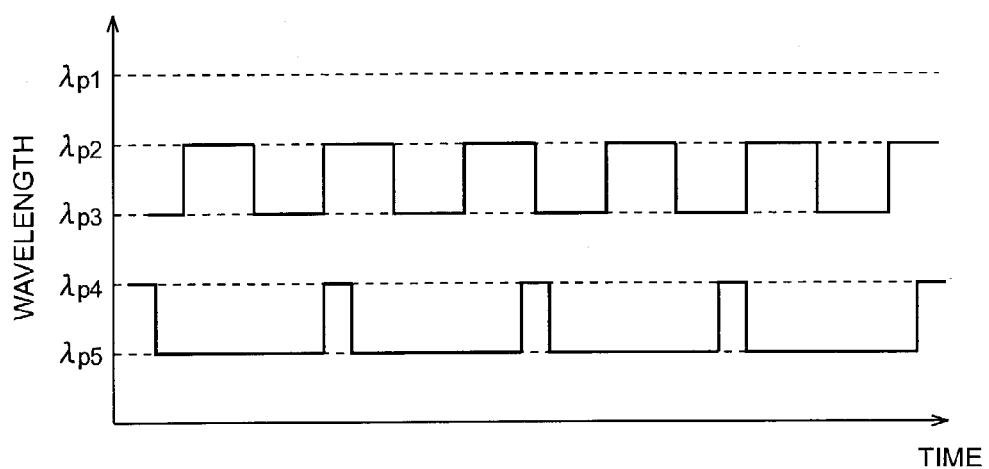
FIG. 15 is a time chart showing another example of change with time (wavelength change pattern) of wavelengths of the pumping light outputted from the pumping light generator in the optical amplifier according to the second embodiment.

FIG. 13 shows spectra of the signal light outputted from the optical fiber 220 of the optical amplifier 200 according to the second embodiment. In FIG. 13, the curve G1310 indicates a span loss fluctuation, the curve G1320 indicates a signal spectrum in the case of no change on the wavelength of the pumping light, the curve G1330 indicates a signal spectrum in the case of changing the wavelength of the pumping light in accordance with the wavelength change pattern C, and the curve G1340 indicates a signal spectrum in the case of changing the wavelength of the pumping light in accordance with the wavelength change pattern D. FIG. 14 is a table showing powers of the pumping light at respective wavelengths in examples of the wavelength change method of the light sources 213a, 213b included in the pumping light generator 210 of the optical amplifier 200 according to the second embodiment. FIG. 14 presents powers of the pumping light at the respective wavelengths, powers of the respective light sources, and the total powers of the two light sources, for each of a case of no change on the wavelength of the pumping light outputted from each of the light sources 213a, 213b, a case of a wavelength change pattern C as shown in FIG. 12, and a case of a wavelength change pattern D as shown in FIG. 15. The length of the optical fiber 220 was 10 km herein. The wavelength region of the signal light fed into the optical amplifier 200 was 1528 nm to 1564 nm, and thus the wavelength bandwidth of the signal light was 36 nm.

In the case without wavelength change where the pumping light outputted from the light source 213a was light with the single wavelength of 1430 nm and the power of 19.7 dBm and the pumping light outputted from the light source 213b was light with the single wavelength of 1456 nm and the power of 18.0 dBm, the deviation of the spectrum of the output signal light from the optical fiber 220 was 0.5 $dB_{p-p}$ in the signal light wavelength band, as shown in FIG. 13.

In contrast to it, in the case of the wavelength change pattern C, the pumping light outputted from the light source 213a was changed in the three wavelengths, the wavelength 1425 nm (the power 16.7 dBm and the time ratio 1/3), the wavelength 1433 nm (the power 15.5 dBm and the time ratio 1/3), and the wavelength 1441 nm (the power 15.1 dBm and the time ratio 1/3), and the pumping light outputted from the light source 213b was changed in the two wavelengths, the wavelength 1459 nm (the power 11.9 dBm and the time ratio 1/3) and the wavelength 1467 nm (the power 15.3 dBm and the time ratio 2/3) (FIG. 12). In this case, as shown in FIG. 13, the deviation of the spectrum of the output signal light from the optical fiber 220 was reduced to 0.2 $dB_{p-p}$ in the signal light wavelength band.

In this state of the wavelength change pattern C, supposing the span loss in the optical fiber transmission line upstream of the optical amplifier 200 is increased by 2 dB, the gain of the upstream EDFA 240a increases to vary the gain spectrum of the EDFA 240a. Then this results in increasing the deviation of the spectrum of the output signal light from the optical fiber 220 in the signal light wavelength band, as shown in FIG. 13.

When this increase of span loss occurs, the wavelength change pattern C is switched to the wavelength change pattern D. In the wavelength change pattern D, the pumping light outputted from the light source 213a was changed in two wavelengths, the wavelength 1433 nm (the power 16.0 dBm and the time ratio 1/2) and the wavelength 1441 nm (the power 16.6 dBm and the time ratio 1/2), and the pumping light outputted from the light source 213b was changed in two wavelengths, the wavelength 1459 nm (the power 10.1 dBm and the time ratio 1/7) and the wavelength 1467 nm (the power 18.1 dBm and the time ratio 6/7) (FIG. 15). As a result of this change, the deviation of the spectrum of the output signal light from the optical fiber 220 was reduced to 0.3 $dB_{p-p}$ in the signal light wavelength band, as shown in FIG. 13.

The wavelength change method of the pumping light outputted from each light source of the pumping light generator 210 as described above is subjected to feedback control based on the signal light spectrum measured by the optical performance monitor 260. By this control, the spectrum of the signal light outputted from the optical fiber 220 can be maintained flat in the signal light wavelength band. It is also possible to employ another method wherein a spectrum of the signal light input into the optical amplifier 200 is measured and wherein the wavelength change method of the pumping light is subjected to feed forward control on the basis of the result of the measurement. It is also possible to employ still another method wherein the wavelength change method of the pumping light is controlled on the basis of information about span loss variation obtained based on monitor light fed together with the signal light from upstream.

When there is a span loss increase downstream of the optical amplifier 200, the gain of the downstream EDFA 240b increases to vary the gain spectrum of the EDFA 240b. Then this results in increasing the deviation of the spectrum of the signal light outputted from the optical amplifier 200. In this case, the wavelength change pattern D is also employed, whereby the deviation of the spectrum of the signal light outputted from the optical amplifier 200 can be maintained flat even with the increase in the deviation of the spectrum of the output signal light from the optical fiber 220.

In each of the cases of no change, the wavelength change pattern C, and the wavelength change pattern D, as shown in FIG. 14, the total power of the pumping light supplied from the light sources 213a, 213b into the optical fiber 220 was about 22 dBm, and the difference in the total power of pumping light was 0.24 $dB_{p-p}$. As for the powers of the pumping light supplied from the individual light sources into the optical fiber 220, the maximum power was 20.6 dBm, which was the power of the pumping light supplied from the light source 213a into the optical fiber 220 in the case of the wavelength change pattern C. Even with consideration to the loss between the light sources 213a, 213b and the optical fiber 220 (typically, about 1.8 dB), the light sources 213a, 213b can be readily realized by currently available semiconductor laser light sources of 200 mW (23 dBm) class output power. Since there also exist semiconductor laser light sources over the output power of 300 mW (=24.7 dBm) in recent years, only one 300 mW-class-output-power light source will do instead of the light sources 213a, 213b shown in FIG. 11. In the latter case, light outputted from one light source is changed in five wavelengths, and there is no need for use of the optical multiplexer 214, which can further decrease the size and price of the pumping light generator 210.

In general, the wavelength bandwidth of signal light that can be amplified by EDFAs under practical use is the bandwidth of 36 nm in the C-band or in the L-band. Accordingly, the spectrum of the wavelength-changed light outputted from the pumping light generator 210 is preferably one having two peaks the center wavelengths of which are 26 nm or more apart from each other.

Figure 16:
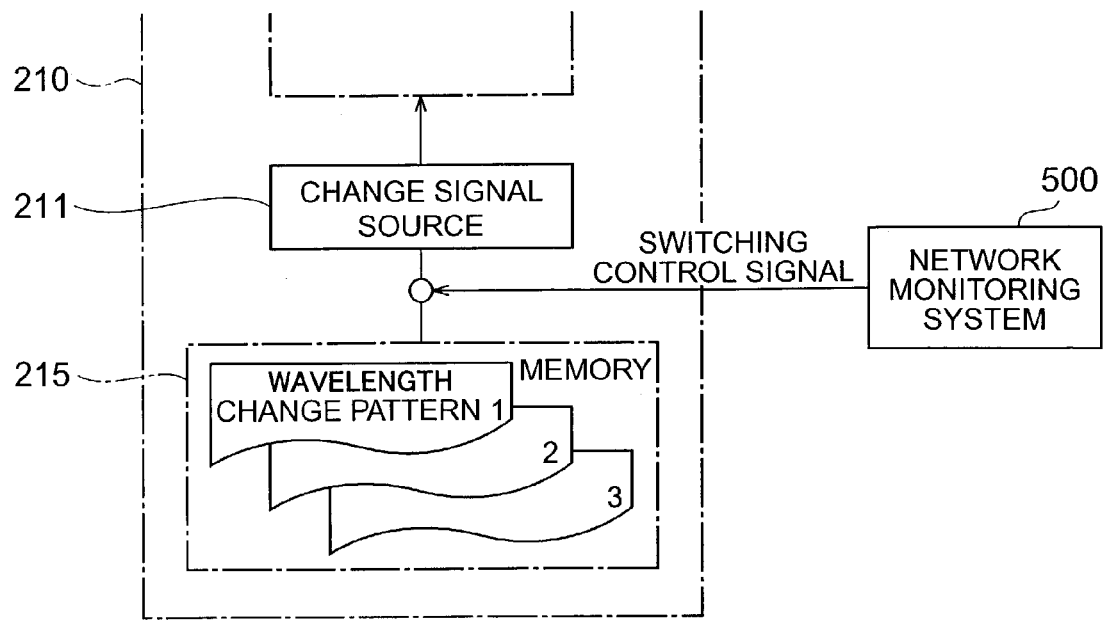
FIG. 16 is an illustration showing a part of another construction of the optical amplifier according to the second embodiment.
Figure 18A:
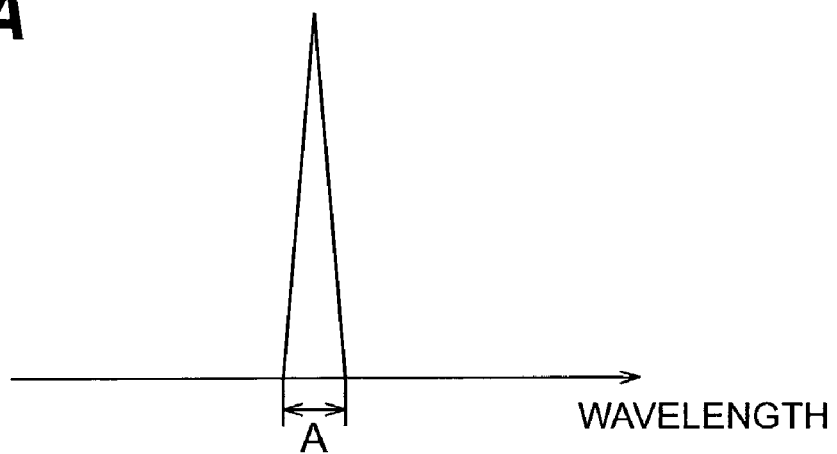
FIGS. 18A and 18B are diagrams showing in detail spectra of light outputted from the light sources included in the pumping light generator.
Figure 18B:
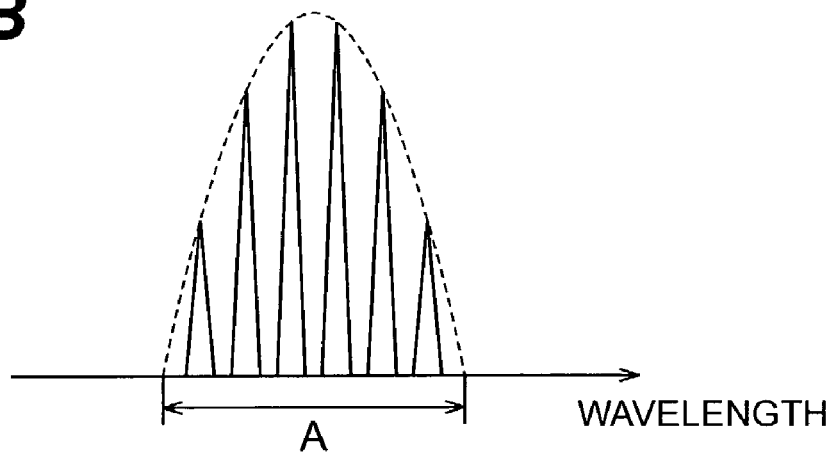

To realize a plurality of kinds of wavelength change patterns as shown in FIG. 15, it is preferable these prepared wavelength change patterns are previously stored into the memory 215. And, as shown in FIG. 16, the stored wavelength patterns are preferably switched in accordance with the change signal from outside such as the network monitoring system 500, and so on. Specifically, the load of the control circuit can be reduced as compared with the case of calculating the wavelength pattern every occurrence of an unusual situation such showing in FIG. 13.

Figure 19A:
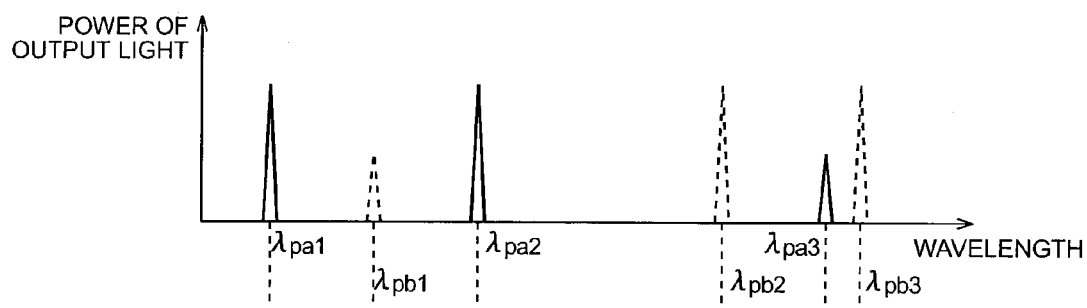
FIGS. 19A and 19B are diagrams showing another example of wavelength ranges of light outputted from the respective light sources included in the pumping light generator.
Figure 19B:
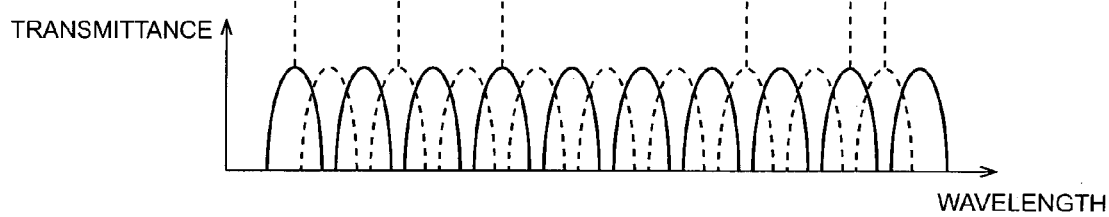

In the above description, the wavelength range $\lambda_{p1}$ to $\lambda_{p2}$ of the light outputted from the light source 213a does not overlap the wavelength range $\lambda_{p3}$ to $\lambda_{p5}$ of the light outputted from the light source 213b, as shown in FIGS. 17A and 17B. Here, FIG. 17A shows the wavelength change pattern in the wavelength range of $\lambda_{p1}$ to $\lambda_{p5}$, and FIG. 17B shows power spectra at each channel. The spectra of FIG. 17B are illustrated like a line spectrum, but if a spectrum width A falls within the range of 0-2 nm (see FIG. 18A), the spectrum width has no effect on the shape of the Raman gain spectrum. Accordingly, as described in the Document 1, a plurality of axial modes may exist in the narrow wavelength range (see FIG. 18B). In this case, mode hop noise or SBS can be effectively avoided. As shown in FIG. 19A, the wavelength range $\lambda_{pa1}$ to $\lambda_{pa3}$ of the light outputted from the light source 213a may overlap the wavelength range $\lambda_{pb1}$ to $\lambda_{pb3}$ of the light outputted from the light source 213b in part, and in this case, an interleaver with the transmission characteristics as shown in FIG. 19B is used as the optical multiplexer 214.

FIG. 19A shows the time-averaged spectrum of the pumping light outputted from the pumping light generator 210, in which peaks indicated by solid lines represent those of the pumping light outputted from the light source 213a and peaks indicated by dashed lines those of the pumping light outputted from the light source 213b. FIG. 19B shows the transmission characteristics of the optical multiplexer 214 as an interleaver, in which solid lines represent the transmission characteristics of the input light from the light source 213a and dashed lines the transmission characteristics of the input light from the light source 213b. As shown in this figure, the transmission wavelengths of the input light from the light source 213a and the transmission wavelengths of the input light from the light source 213b alternately appear in the interleaver.

When the interleaver is used as the optical multiplexer 214, the wavelength range $\lambda_{pa1}$ to $\lambda_{pa3}$ of the light outputted from the light source 213a can overlap the wavelength range $\lambda_{pb1}$ to $\lambda_{pb3}$ of the light outputted from the light source 213b in part. This redundant configuration is preferable, because in the event of failure in one light source 213a, the pumping light for optical amplification of the signal light can be outputted even from only the other light source 213b.

However, complete superposition of the wavelengths of the light outputted from the respective light sources 213a, 213b is not preferable in terms of pumping efficiency and power consumption. Namely, the gain bands assigned to the respective light sources 213a, 213b are preferably different from each other in terms of power consumption and cost. Then let us use the following expressions (5a) and (5b) to define a mean wavelength $\lambda_A$ as a weighted mean of powers $P_{an}$ of the lightwaves of the respective wavelengths $\lambda_{pan}$ outputted from the light source 213a and a mean wavelength $\lambda_B$ as a weighted mean of powers $P_{bn}$ of the lightwaves of the respective wavelengths $\lambda_{pbn}$ outputted from the light source 213b.

$$\lambda_A = \Sigma(<\lambda_{span}><P_{an}>)/\Sigma<P_{an}> \quad (5a)$$

$$\lambda_B = \Sigma(<\lambda_{spbn}><P_{bn}>)/\Sigma<P_{bn}> \quad (5b)$$

Then the difference between the mean wavelengths $\lambda_A$ and $\lambda_B$ is preferably 4 nm or more. The subscript n is for identification of each wavelength, Z indicates the summation for the subscript n, and the operator <*> the time average.

As detailed above, according to the present invention, the wavelength-changed light resulting from the change of the wavelength by the changing means in the light generator is supplied as the pumping light into the optical amplification medium. Then the signal light is amplified in the optical amplification medium with the supply of the pumping light. Since this supply of the pumping light into the optical amplification medium is equivalent to virtually simultaneous supply of pumping light of channels in the number over the number of light sources into the optical amplification medium, the desired gain spectrum can be readily obtained by the compact, inexpensive light generator.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A light generator comprising:
   a single light source being capable of changing the wavelength of pumping light to be emitted, said single light source including: a semiconductor light emitting device having a light reflecting surface and a light outputting surface on both sides of a photoactive layer which generates light with supply of a drive current; and an optical feedback device being separated from said semiconductor light emitting device and constituting a resonator together said light reflecting surface of said semiconductor light emitting device;
   a change signal source for outputting change signals to control the wavelength change of the pumping light to be emitted;
   changing means, in accordance with the change signals outputted from said change signal source, for repeatedly changing a wavelength of light outputted from said single light source or that of light existing in said single light source by repeatedly changing reflection wavelength of said optical feedback device as time goes on, whereby said single light source outputs wavelength-changed pumping light resulting from change of the wavelength by said changing means; and
   a memory that stores wavelength change patterns each for repeatedly changing wavelength of the light outputted from said semiconductor light emitting device.

2. A light generator according to claim 1, wherein a mean value over a predetermined period of total power of pumping light outputted from said single light source is not less than 88 mW.

3. A light generator according to claim 1, wherein a mean value over a predetermined period of total power of pumping light outputted from said single light source is not less than 150 mW.

4. A light generator according to claim 1, wherein a wavelength of light outputted from said singe light source is periodically changed.

5. A light generator according to claim 1, wherein a difference between a maximum wavelength and a minimum wavelength of the wavelength-changed pumping light is not less than 4 nm.

6. A light generator according to claim 1, wherein a spectrum of the wavelength-changed pumping light has two peaks whose center wavelengths are not less than 26 nm apart from each other.

7. A light generator according to claim 1, wherein said memory stores the wavelength change patterns each for repeatedly changing wavelength and power of the light outputted from said single light source, and
   wherein said change signal source outputs change signals in accordance with the selected one of the stored wavelength change patterns.

8. An optical amplifier comprising:
   an optical amplification medium for amplifying signal light; and
   a light generator according to claim 1, for generating wavelength changed pumping light to be supplied into said optical amplification medium.

9. An optical amplifier according to claim 8, wherein a wavelength change pattern, corresponding to change with time of the wavelength of the pumping light outputted from said pumping light source, is set so as to flatten a spectrum at the signal light upon emergence from said optical amplification medium.

10. A light generator according to claim 1, wherein pumping light outputted from said semiconductor light emitting device is selected from two or more longitudinal modes.

11. A light generator according to claim 1, wherein said optical feedback device has a diffractive grating and constitutes a part of said resonator.

12. An optical amplifier comprising:
    an optical amplification medium for amplifying signal light; and
    a light generator for generating wavelength-changed pumping light to be supplied into said optical amplification medium,
    wherein said light generator comprises;
       a single light source being capable of changing the wavelength of pumping light to be emitted, said single light source including: a semiconductor light emitting device having a light reflecting surface and a light outputting surface on both sides of a photoactive layer which generates light with supply of a drive current; and an optical feedback device being out of said semiconductor light emitting device and constituting a resonator together with said light reflecting surface of said semiconductor light emitting device;
       a change signal source for outputting change signals to control the wavelength change of the pumping light to be emitted;
       changing means, in accordance with the change signals outputted from said change signal source, for repeatedly changing a wavelength of light outputted from said single light source or that of light existing in said single light source by repeatedly changing reflection wavelength of said optical feedback device as time goes on, whereby said single light source outputs wavelength-changed pumping light resulting from change of the wavelength by said changing means; and
       a memory that stores wavelength change patterns each for repeatedly changing wavelength and power of the light outputted from said semiconductor light emitting device,
    wherein traveling directions of respective the signal light and the pumping light are opposite to each other in said optical amplification medium, and wherein a frequency of wavelength change of the pumping light outputted from said single light source is ten or more times greater than a frequency given by the inverse of a time for which the signal light propagates through an effective length of said optical amplification medium.

13. An optical amplifier comprising:

an optical amplification medium far amplifying signal light and a light generator for generating wavelength-changed pumping light to be supplied into said optical amplification medium, wherein said light generator comprises:

a single light source being capable of changing the wavelength of pumping light to be emitted, said single light source including: a semiconductor light emitting device having a light reflecting surface and a light outputting surface on both sides of a photoactive layer which generates light with supply of a drive current; and an optical feedback device being out of said semiconductor light emitting device and constituting a resonator together with said light reflecting surface of said semiconductor light emitting device;

a change signal source for outputting change signals to control the wavelength change of the pumping light to be emitted;

changing means, in accordance with the change signals outputted from said change signal source, for repeatedly changing a wavelength of light outputted from said single light source or that of light existing in said singe light source by repeatedly changing reflection wavelength of said optical feedback device as time goes on, whereby said single light source outputs wavelength-changed pumping light resulting from change of the wavelength by said changing means; and a memory that stores wavelength change patterns each for repeatedly changing wavelength and power of the light outputted from said semiconductor light emitting device, wherein traveling directions of respective the signal light and the pumping light are identical to each other in said optical amplification medium, and wherein a frequency of wavelength change of the pumping light outputted from said single light source is ten or more times greater than a walkoff frequency determined from an effective length and chromatic dispersion of said optical amplification medium and a wavelength spacing between the signal light and the pumping light.

* * * * *